J. WAITEKAITES.
GRAIN CLEANER.
APPLICATION FILED JULY 20, 1918.
1,360,062.
Patented Nov. 23, 1920.
3 SHEETS—SHEET 1.
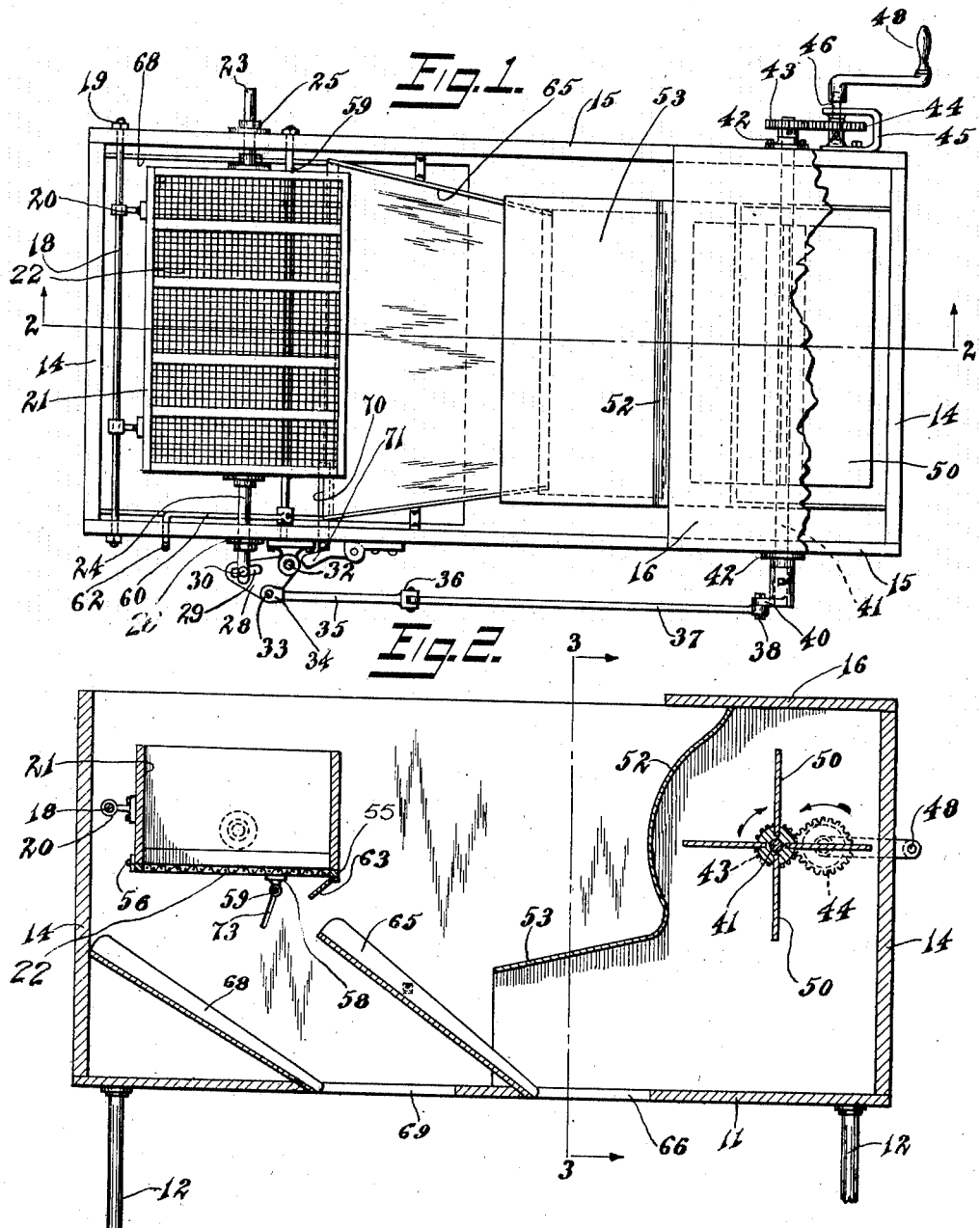
INVENTOR
Joseph Waitekaites
BY Oscar Geier
ATTORNEY J. WAITEKAITES.
GRAIN CLEANER.
APPLICATION FILED JULY 20, 1918.
1,360,062.
Patented Nov. 23, 1920.
3 SHEETS—SHEET 2.
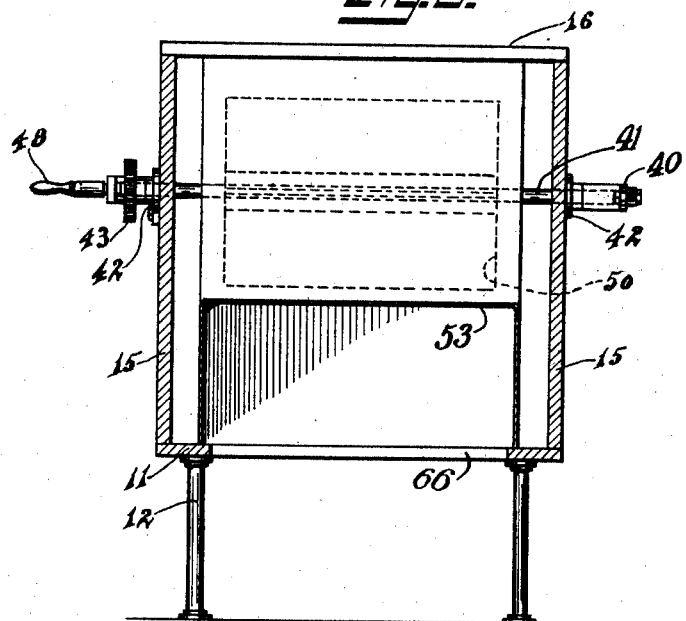
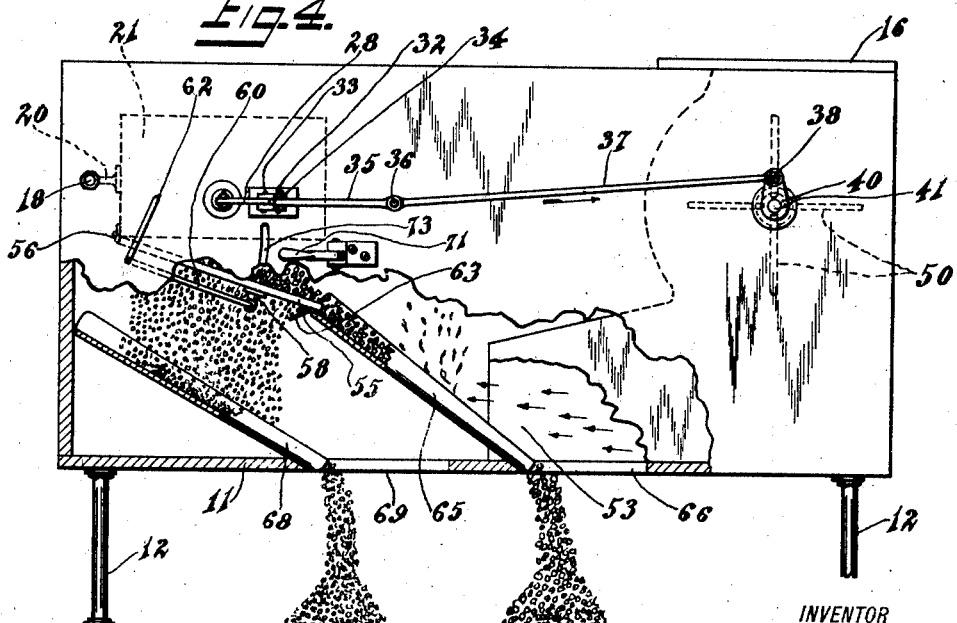
INVENTOR
Joseph Waitekaites
BY
ATTORNEY J. WAITEKAITES.
GRAIN CLEANER.
APPLICATION FILED JULY 20, 1918.
1,360,062.
Patented Nov. 23, 1920.
3 SHEETS—SHEET 3.
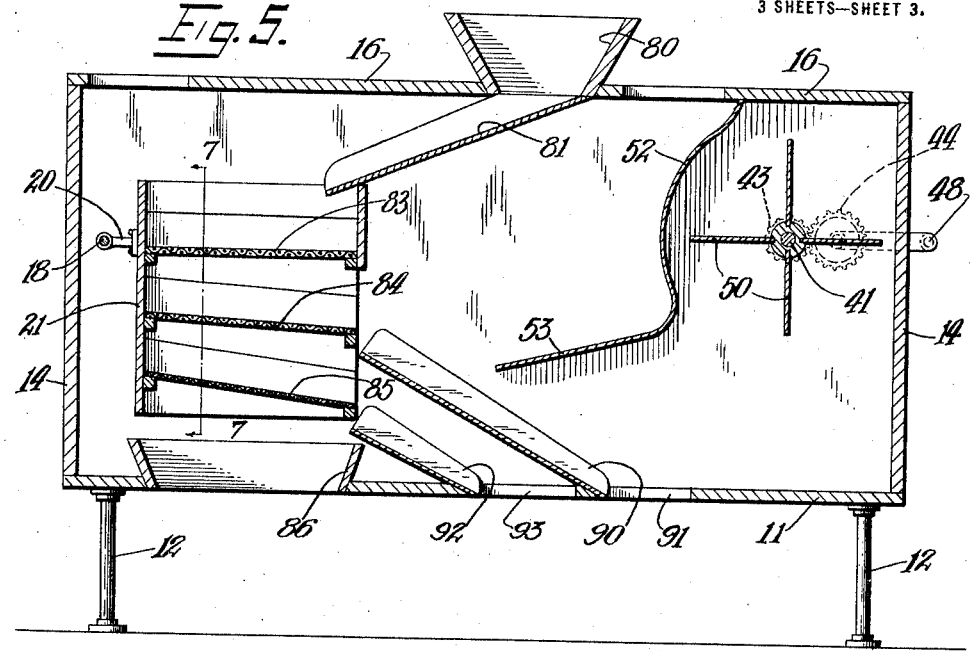
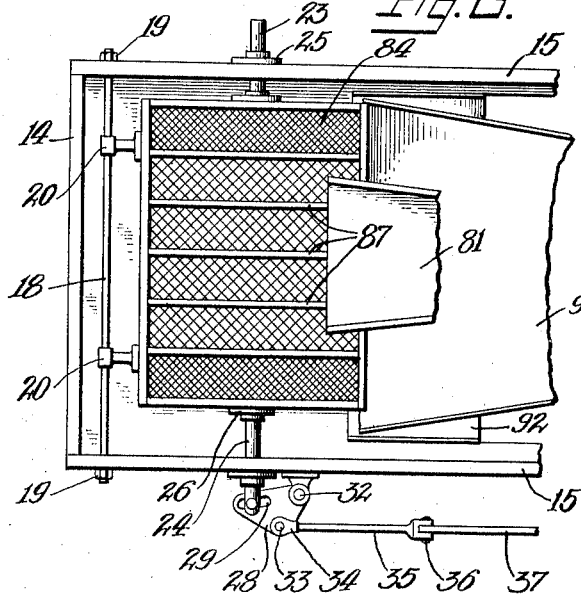
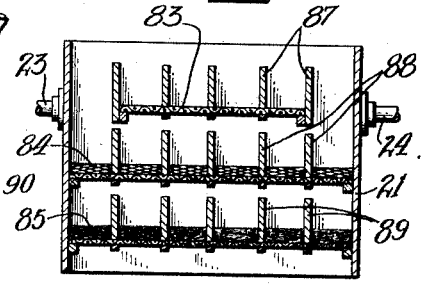
INVENTOR
Joseph Waitekaites
BY
ATTORNEY

UNITED STATES PATENT OFFICE.

JOSEPH WAITEKAITES, OF LITTLE ROCK, ARKANSAS.

GRAIN-CLEANER.

1,360,062.             Specification of Letters Patent.     Patented Nov. 23, 1920.

Application filed July 20, 1918. Serial No. 245,806.

*To all whom it may concern:*

Be it known that I, JOSEPH WAITEKAITES, a citizen of Russia, resident of Little Rock, county of Pulaski, and State of Arkansas, have invented certain new and useful Improvements in Grain-Cleaners, of which the following is a specification.

This invention relates to improvements in grain cleaners, and has as its special object the provision of a mechanism which will effectually clean such grain as wheat, oats, and the like from chaff and dirt, winnowing and blowing the lighter particles away.

A further object is to provide such devices in forms which are cheap to construct, durable in their nature, and easily operated.

These and other like objects are attained by the novel construction and combination of parts hereinafter described and shown in the accompanying drawings, forming a material part of this disclosure, and in which:

Figure 1 is a top plan view of a grain cleaner made in accordance with the invention, parts being broken away in order to disclose the interior.

Fig. 2 is a longitudinal sectional view taken on line 2—2 of Fig. 1.

Fig. 3 is a vertical sectional view taken on line 3—3 of Fig. 2.

Fig. 4 is a side elevational view of the same, parts being broken away in order to show the interior.

Fig. 5 is a longitudinal sectional view similar to Fig. 2 but showing a modified form of construction.

Fig. 6 is a fragmentary top plan view of the same, similar to Fig. 1, and

Fig. 7 is a transverse sectional view, taken on line 7—7 of Fig. 5.

In carrying out the invention, use is made of a rectangular casing having a bottom wall 11, supported by posts 12, which rest upon any suitable foundation, the casing comprising end walls 14, and side walls 15, over which extends a partial cover plate 16.

Rigidly engaged within, and near one end of the casing, is a bar 18, held in position with relation to the side walls by nuts 19, and slidably mounted upon the bar are spaced brackets 20, the feet of which are engaged with the outer wall of a hopper 21, arranged transversely within the casing, so as to move from side to side therein.

Attached to the ends of the hopper 21, are shafts 23 and 24, the same passing outwardly through the side walls 15, where they are engaged in flanged brackets 25 and 26.

One of the shafts 24 extends to some distance through the side and is forked as to engage upon opposite sides of a triangular shaped lever 28, having a slot 29, in which a pin 30 operates, the pin being fixed in the forked end of the shaft 24, so that as the lever 28 is turned upon the pivotal support 32, reciprocative motion is conveyed to the hopper 21.

In the opposite corner of the lever 28, is a pin 33, connecting a forked link 34, the same being engaged with a rod 35, having a pivotal connection 36, with a rod 37, pivotally engaged by the pin 38, with a crank 40, fixed upon the end of a transverse shaft 41, journaled in bearings 42, the shaft passing through the casing and having upon its opposite end a spur gear 43, meshing with a mating gear 44, on a shaft 46, carried in the bracket 45, secured to the outer side of the container frame, the shaft having upon its extending end a crank handle 48, by means of which rotary motion may be transferred to the shaft and through its connections, cause the hopper 21 to be oscillated.

Also mounted upon the shaft 41, are the blades 50, of a fan driven by the crank 48, the fan being partially covered by a curved partition 52, secured between the sides 15 of the casing, the lower part of the partition being formed into a cover plate 53, by which a current of air from the fan is directed toward the hopper 21.

The bottom 55 of the hopper 21, is engaged at the rear lower edge of the hopper by hinges 56, so that the same can be lowered and is formed with a meshed netting 22.

Engaged with the bottom are brackets 58 in which is secured a shaft 59, having a crank extension 60, terminating in an angularly outstanding handle 62, so that the netting may be raised or lowered by its operation, it being normally held in a raised position by sliding bolts 70 controlled by the handle 71, set in the sides 15 of the casing, the shaft 59 operating in slots 73 formed through the casing.

Engaged permanently with the front edge of the netted bottom 55 is an inclined plate 63, for diverting the contents delivered from the hopper to a chute 68 fixed between the sides of the casing and so positioned below said plate 63 as to receive the material discharged from hopper 21 and sliding down the incline of said plate 63, and then through an opening 69, formed through the bottom 11 of the casing.

Another chute 68, delivers the grain as the hopper 21, is actuated through an opening 69, rearward of the first named opening at the bottom of the casing, so that the grain of one size is separated from that of a larger size, or larger particles, as the hopper is agitated. It will be obvious that the action of the fan 50, drives away the lighter particles, such as bran, so that the same is not mixed with the grain as soon as the grain leaving the hopper arrives on the inclined plate 63.

In operation the hopper 21, having been filled with grain, the handle 48 is turned, whereupon the lighter particles are blown away by means of a current of air entered by the fan 50, while grain of proper size drops through the grating 22, upon the chute 68, and is delivered below the apparatus. The collection of larger sized grains or other articles gathered in the hopper can be dumped by operating the handle 62, allowing the remaining contents of the hopper to drop into the chute 65, and be delivered outwardly from the machine separately from the grain.

In the modifications shown in Figs. 5 to 7 inclusive, an independent funnel 80 is provided by which the grain may be entered, the same passing through the inclined spout 81, into the hopper 21, which in this case, is provided with a plurality of transverse screens, respectively 83, 84 and 85, the lower screens being disposed at an inclination relative to the upper screen of the hopper, and a funnel shaped chute 86 is provided to receive the dust which may drop directly therethrough.

Secured longitudinally, with relation to the screens 83, 84 and 85, are a plurality of vertical partitions 87, 88, and 89, so as to effectively shake the grain and it will be noticed that the upper screen 83, is narrower and of much coarser netting than that of the intermediate screen 84, which in turn is relatively coarser than the lowermost screen 85, the arrangement being such that all particles will drop through the upper screen 83, upon the surface of the intermediate screen 84, where, due to its inclination, irregular particles are dropped into the chute 90, and conveyed outwardly through the opening 91, while the finer particles from the screen 85, drop into a corresponding chute 92, and are delivered outwardly through an opening 93 in the bottom of the machine. The arrangement and operation otherwise being like that previously described.

Having thus described my invention what I claim as new and desire to secure by Letters Patent, is.

In a grain cleaner of the character described, the combination of a funnel having an inclined spout with a hopper, a plurality of transversely disposed superposed screens in said hopper, two of said screens disposed at an inclination relative to the upper one, a funnel below said screens for providing a dust outlet, a plurality of vertical partitions longitudinally disposed with relation to said screens, said screens having nettings of different width of mesh, chutes for conveying the different grades of grain coming from the screens to the bottom of the cleaner, means for blowing a current of air through said screens and means for imparting a reciprocating motion to said hopper.

In testimony whereof I have affixed my signature.

JOSEPH WAITEKAITES.